J. ASHCROFT.
Steam-Stove.

No. 224,625.   Patented Feb. 17, 1880.

Witnesses:
E. D. Barnum
G. W. Balloch

Inventor:
John Ashcroft

UNITED STATES PATENT OFFICE.

JOHN ASHCROFT, OF BROOKLYN, NEW YORK, ASSIGNOR TO SARAH JANE ASHCROFT, OF SAME PLACE.

STEAM-STOVE.

SPECIFICATION forming part of Letters Patent No. 224,625, dated February 17, 1880.

Application filed October 2, 1879.

*To all whom it may concern:*

Be it known that I, JOHN ASHCROFT, of the city of Brooklyn, in the county of Kings and State of New York, have invented certain new and useful Improvements in Steam-Stoves; and I do hereby declare the following to be a full, clear, and exact description of the invention, such as will enable others skilled in the art to which it appertains to make and use the same, reference being had to the accompanying drawings, and to letters of reference marked thereon, which form a part of this specification, wherein—

Figure 1:
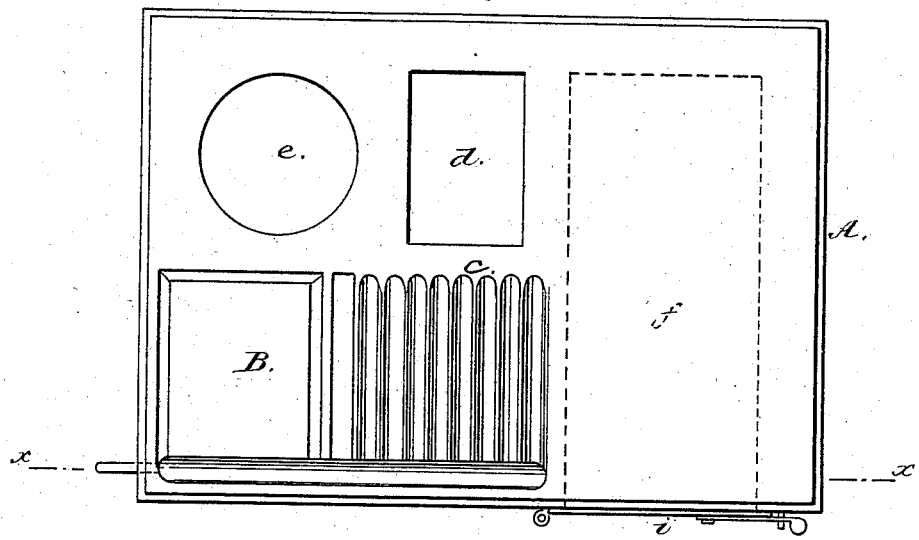
Figure 2:
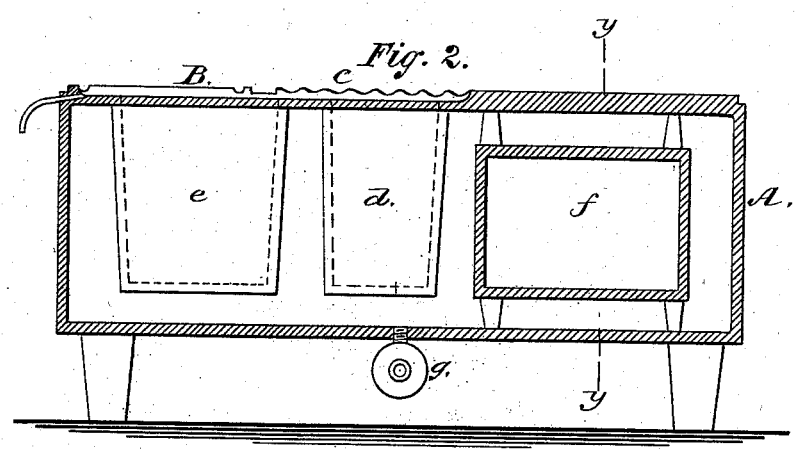
Figure 3:
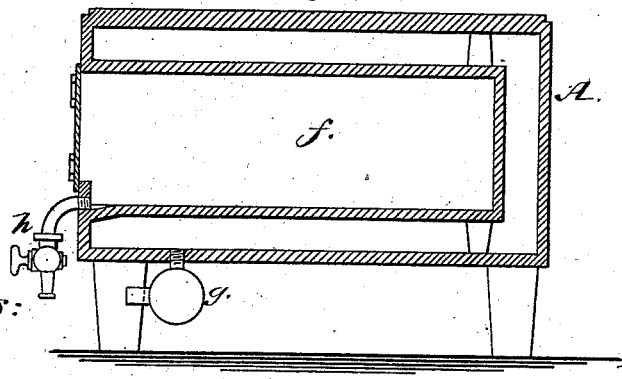

Figure 1 represents a top view of my improved stove with an oven therein, indicated by dotted lines. Fig. 2 is a front view thereof, in section, upon the line $x\ x$ of Fig. 1. Fig. 3 is a view thereof, in section, upon the line $y\ y$ of Fig. 2.

The object of my invention is the construction of a stove for culinary purposes to be operated by steam only, which shall be capable of accomplishing all the duties required of a kitchen-range, and so that the difficulties attendant upon the use of steam apparatus in the household may be mainly avoided.

The nature of my invention consists in such a construction of a steam-chamber that there may be provided in it and of it arrangements for baking, boiling, frying, broiling, and roasting; and also in such a construction of this steam-chamber that joints requiring packing and other devices to prevent the escape of steam may be dispensed with.

In the drawings, A represents the frame or outer wall of the stove, which may be any desired shape or size. $d$ and $e$ represent depressions in the top of A, which may be multiplied to any number consistent with the size of the stove, and these depressions may also be of any shape, size, or depth which may be required for the preparation of the various articles of food to be cooked. B and C are sections of the top of the wall A, or "stove," as it may be called, and are to be used for frying and broiling, and are preferably inclined and provided with depressions at the front to collect and receive drippings from meats. C is corrugated, to be used as a broiler more particularly. $f$ is an oven opening on the side of and inclosed in the wall A, and supported at the rear by lugs or stops extending from its outer surface to the inner face of the outer wall proper, A. As I construct it, it is, in fact, a part of the wall A, which is also true of the depressions $d$ and $e$. This oven $f$ is closed by a door, which may be constructed either single or double; or it may be covered and a non-conductor applied to its exterior. It is also inclined from rear to front, where, at the bottom, an aperture is made with pipe-connection leading to a trap or proper receptacle for drippings, which are carried by this arrangement continuously from the meat being cooked.

The steam-chamber is the space intermediate the walls A and cooking-chambers $d$, $e$, and $f$, and is, of course, provided with suitable steam connections and traps for the introduction and escape of steam and water.

The steam cooking ranges, stoves, and ovens heretofore made have been constructed of various parts, requiring to be bolted or riveted together to form the apparatus. The joints thus made must be made steam-tight, and some of the various expedients for that purpose, such as packing or calking, must be used. With the best means employed the joints are liable to leak at times, and, in addition, especially in cast-iron apparatus, the steam-chamber is weakened by the drilling of the necessary holes.

This invention is intended especially for use in the household, where neither the knowledge nor skill required in the case of steam-receptacles with joints can be found. From these patent facts it will be readily appreciated that the value of steam cooking apparatus, and even its use with steam under pressure, depends in large measure upon obviating the objections stated.

In my new apparatus I have cast the entire chamber, cooking-receptacles, and broiling device in one piece, thereby avoiding the necessity of any joints, except where the necessary steam-connections are made.

In casting the device a dry-sand core is made, and the casting is made, leaving a sufficient number of holes for the removal of the core, which holes are afterward plugged up. The manner of casting is not new, and no claim is made therefor.

This apparatus will be cast of sufficient strength to resist any pressure required, and will be provided with steam-traps and safety-valves.

The various devices for frying and broiling and for drawing off the juices from the top are not claimed herein, as another application has been made to secure those features.

Having described my invention, what I claim to be new is—

1. The combination, in a steam-stove cast in one piece, of the outer wall, A, the inner cooking chambers or depressions, and the intermediate steam-chamber, substantially as described.

2. The combination, in a steam-stove cast in one piece, of an outer wall, A, receptacles for cooking, and an intermediate steam-chamber between the outer wall and cooking-receptacles, the upper or top plate of the outer wall being provided with corrugations for broiling, substantially as described.

3. The combination, in a steam-stove cast in one piece, of the outer wall, A, the inner cooking-chambers, and an intermediate steam-chamber with a steam-trap, substantially as described.

4. The combination, in a steam-stove cast in one piece, of the outer wall, A, the inner cooking-chambers, and an intermediate steam-chamber with a safety-valve, substantially as described.

In testimony that I claim the foregoing I have hereunto set my hand this 2d day of October, 1879.

JOHN ASHCROFT.

Witnesses:
E. B. BARNUM,
G. W. BALLOCH.